March 13, 1962  A. L. NELSON  3,025,080
BICYCLE WITH SEAT RECIPROCATING MECHANISM
Filed April 10, 1959  2 Sheets-Sheet 1
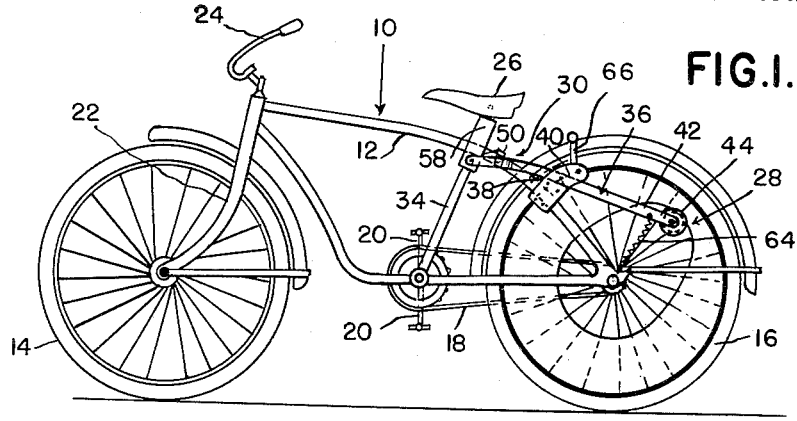
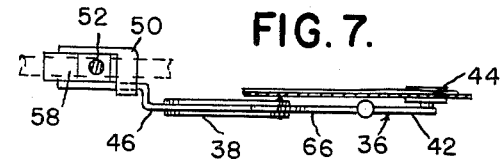
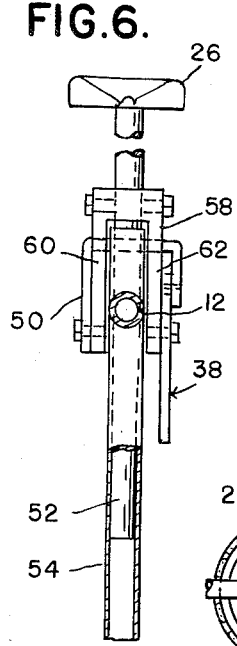
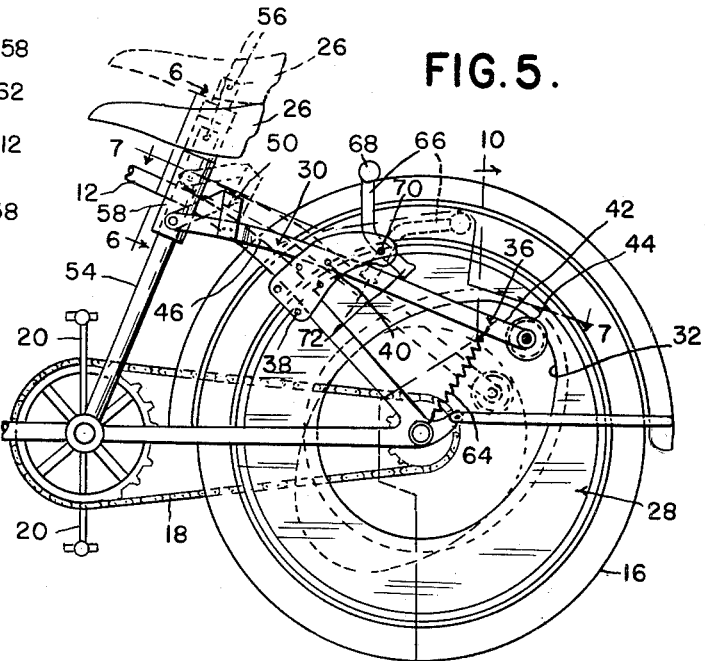
INVENTOR.
AUGUST L. NELSON
BY
Whittemore, Hulbert & Belknap
ATTORNEYS March 13, 1962

A. L. NELSON 3,025,080

BICYCLE WITH SEAT RECIPROCATING MECHANISM

Filed April 10, 1959

INVENTOR.
AUGUST L. NELSON

BY
Whittemore, Hulbert & Belknap

ATTORNEYS

United States Patent Office 3,025,080
Patented Mar. 13, 1962

3,025,080
BICYCLE WITH SEAT RECIPROCATING MECHANISM
August L. Nelson, 2916 Mesa Drive, West Covina, Calif.
Filed Apr. 10, 1959, Ser. No. 805,542
8 Claims. (Cl. 280—226)

This invention relates generally to bicycles, and refers more particularly to a bicycle having seat reciprocating mechanism.

Children have long envisioned their tricycles and bicycles as imaginary horses upon which they may "ride the range" in their games of cowboys and Indians. It is common to see them straighten and slouch on the seat of their wheel vehicles to imitate the rise and fall of a rider on a horse. The slow gait of a horse, as first known to a youngster, is one of a repeated rise and fall of the saddle.

It is an object of this invention to provide a bicycle having seat reciprocating mechanism which will simulate the ride of a horse.

It is a further object of this invention to provide seat reciprocating mechanism either as original equipment or as an attachment for a bicycle.

Another object of this invention is to provide seat reciprocating mechanism for a bicycle which can be rendered operative or inoperative at the rider's option.

Still another object of this invention is to provide seat reciprocating mechanism including a member having a cam track of any desired contour depending upon the seat motion desired.

A further object of this invention is to provide a seat reciprocating mechanism for a bicycle which is simple and relatively inexpensive to manufacture and which can be installed without any special skill or mechanical aptitude.

These and other objects and advantages will be more fully appreciated upon reading the following specification, in conjunction with the accompanying drawings, wherein:

FIGURE 1 is a side view of a bicycle having this invention incorporated thereon.

FIGURE 5 is an enlarged view of the back part of the bicycle of FIGURE 1, showing the invention in greater detail.

FIGURE 6 is an enlarged front view of the seat supporting part of the bicycle of FIGURE 1, as seen in the plane of line 6—6 in FIGURE 5.

FIGURE 7 is a top plan view of the actuating or control arm detail of the embodiment illustrated, as seen in the plane of line 7—7 of FIGURE 5.

Figure 2:
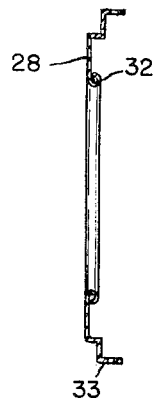
FIGURE 2 is a cross-sectional view of the wheel disk employed with the disclosed form of this invention.
Figure 4:
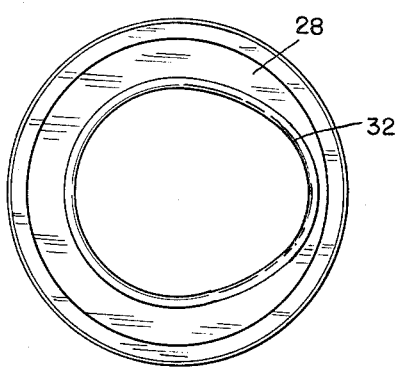
FIGURE 4 is a front plan view of the wheel disk shown by FIGURE 2.

Referring to the drawings, 10 is a bicycle having a frame 12, a front wheel 14, and a rear wheel 16. The conventionally known chain drive 18 is used to operate the bicycle upon operation of the pedals 20. The front fork 22 of the bicycle is rotatable by the handle bars 25 to steer the bicycle, and a seat 26 is provided for the user of the bicycle.

It will be noted that the seat 26 is adjustable vertically between the full and dotted line positions shown in FIGURE 5 of the drawings. Such seat 26 may be automatically raised and lowered in the course of operating the bicycle, if desired, to simulate the ride characteristics on a horse. This is accomplished by motion transmitting means 30 comprising a cam in the form of a wheel disk 28 and a lever arm 36.

Figure 3:
FIGURE 3 is a cross-sectional view of a modified form of wheel disk usable in the practice of this invention.

The wheel disk 28 just mentioned, is a large circular disk of metal, as in FIGURE 2, or of plastic or other material, as in FIGURE 3. This disk 28 is secured to the rear wheel 16 of the bicycle within the exterior periphery thereof. Such disk 28 may be fastened to the wheel rim or elsewhere thereon, as desired. The disk 28, when of metal as in FIGURE 2, may be formed to include an inner peripheral cam contour surface 32 by rolling the edge thereof inwardly. If the disk is of plastic or some other material in which this cannot be readily accomplished a split tubular member 34 may be used, as shown in FIGURE 3.

Figure 11:
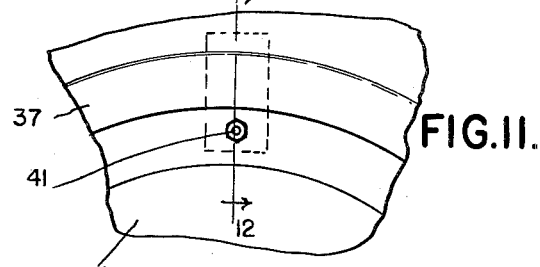
FIGURE 11 is an enlarged fragmentary section of a modified wheel disk on the rear wheel of a bicycle.
Figure 10:
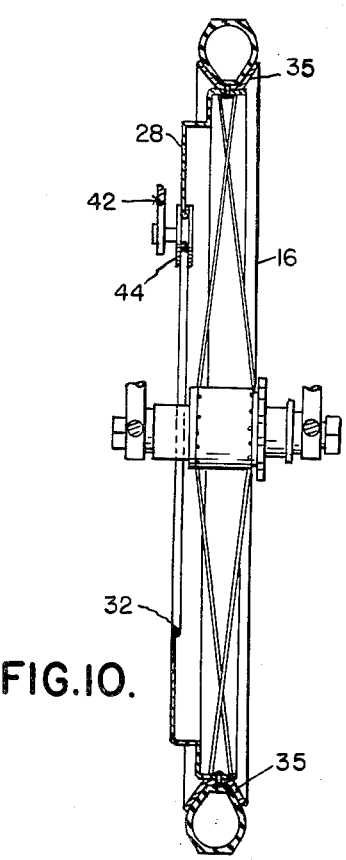
FIGURE 10 is an enlarged section through the rear wheel of the bicycle, as seen in the plane of line 10—10 of FIGURE 5.
Figure 12:
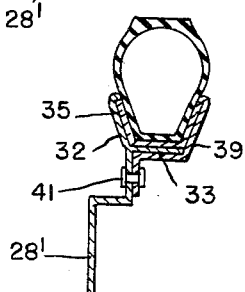
FIGURE 12 is a cross-sectional view of the disk and securing bracket shown by FIGURE 11, as seen in the plane of line 12—12 thereon.

Another form of wheel disk 28' is shown by FIGURES 11 and 12. This disk may be of plastic or similar material. It is formed to include a flange part 33 (as do the other disks 28) which is engaged with the inner periphery of the wheel rim 35. It also includes a side flange 32, which the other disks do not have, to engage one side face of the wheel rim 35. A bracket 39 is formed to complement the other side face of the wheel rim 35 and is used to secure the disk 28' to the rear wheel of the bicycle, as by fasteners 41.

Referring now to FIGURE 5, the lever arm 36 is used with the wheel disk 28 and is pivotally mounted on the bicycle frame 12. A bracket member 38 is secured to the frame 12 and has the lever arm fulcrumed thereon as at 40. The rearwardly extending end portion 42 of the lever arm 36 has a cam following roller 44 provided thereon for engagement with the cam surface 32 of the wheel disk 28. The forwardly extending end portion 46 of the lever arm 36 is engaged with the support mechanism of the bicycle seat 26.

The lever arm 36 is shaped to avoid interference with the bicycle frame 12. It may be bent to the form shown by FIGURE 7, or otherwise, as necessary to fulfill its intended purpose. The roller 44 is disposed in the plane of the cam surface 32 of the wheel disk 28. The forwardly disposed end portion 46 of the lever arm 36 may include a bracket 50 to provide a fork for more suitable engagement with the seat mechanism, as will be described.

The bicycle seat 26 is mounted on the upper end of a vertically adjustable post 52 received within a tubular part 54 of the bicycle frame. This is a conventionally known arrangement to allow the seat 26 to be adjusted to different vertical heights, as best suits the user of the bicycle. The seat 26 is also forwardly and rearwardly tiltable on the vertically adjustable post 52, as on the pivotal axis 56.

In the practice of this invention, the vertically adjustable supporting post 52 for the seat 26 is not set in any particular position but is left freely reciprocal within the frame part 54. A yoke member 58 is secured to the post 52 and has its arm parts 60 and 62 disposed in spaced relation on each side of the post receptive part of the frame 12. The fork provided by the lever end 46 and its bracket 50 is pivoted to the yoke member, as shown by FIGURES 5-7. Accordingly, the forward end 46 of the lever arm 36 is adapted to raise and lower the bicycle seat post 52, and the seat 26, in accordance with the rise and fall created by the form of the cam surface 32.

If desired, the disclosed mechanism for automatically raising and lowering the bicycle seat 26, in the course of operating the bicycle, may be inactivated. A coil spring 64 is engaged between the bicycle frame 12 and the end portion 42 of the lever arm 36. When the bicycle seat is unoccupied, as in walking the bike, or standing up while riding, the spring 64 is effective to hold the roller 44 out of engagement with the cam surface 32. Such spring 64 also serves to counterbalance the lever arm 36.

Figure 9:
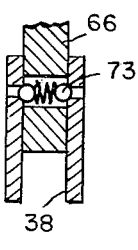
FIGURE 9 is a cross-sectional view through the lever arm supporting bracket near the rear wheel of the bicycle, as seen in the plane of line 9—9 of FIGURE 8.
Figure 8:
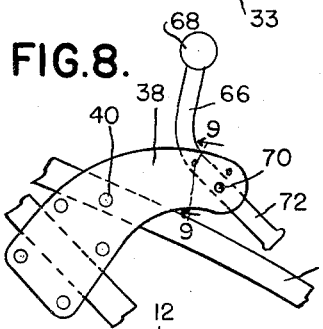
FIGURE 8 is an enlarged side view of the pivotal member used in the illustrated embodiment of this invention.

A more positive means of disengagement is afforded by the lever 66 on the fulcrum bracket 38. By moving the knob end 68 of the lever rearwardly, it rotates on its pivotal axis 70 and causes its working end 72 to depress the seat operating lever arm 36 into an inactive position. This is best shown by FIGURE 8. A spring detent 73 may be used to hold the lever 66 in an inactive position. Such means is shown by FIGURE 9.

*Operation and Use*

The means disclosed for simulating a ride different than is normally experienced on a bicycle may be provided on a new bicycle, or may be incorporated as an attachment for a used bicycle.

The wheel disk 28 is secured to the rear wheel 16 of a bicycle, preferably on the side opposite the chain drive 18. The bracket 38 is secured to the bicycle frame 12 rearwardly of the bicycle seat 26. The lever arm 36 is pivotally supported on the bracket 38 and has the roller 44 at its rearwardly extended end portion 42 received within the internal cam surface 32 of the wheel disk 28. The forwardly disposed end portion 46 of the lever arm 36 is secured to the seat post 52 via the yoke member 58 thereon.

The coil spring 64 biases the roller 44 against engagement with the cam surface 32, and the control lever 66, according to its pivotal position, positively holds the lever arm 36 inactively disposed, or for operation, as will be described.

Normally, the bicycle 10 is started and operated with the disclosed mechanism inactivated by means of the control lever 66. To obtain the desired cam ride sensation, the operator of the bike reaches back and moves the knob end 68 of the lever member 66 forwardly. If the rider is standing up at the time, that is, his weight is off the bicycle seat 26, the spring 64 keeps the cam following roller 44 biased out of engagement with the cam surface 32 of the wheel disk member. However, when the rider sits on the seat 26, his weight overcomes the biasing resistance of the spring 64, and the roller 44 is then moved into cam engaging position. Thereafter, as the rear wheel 16 rotates, the cam surface 32 causes the lever arm 36 to rise and fall according to its cam contour, and the seat 26 and rider thereon will rise and fall relative to the bicycle frame 12.

A simple eccentric cam shape, such as is shown in the drawings, causes the bicycle seat to rise and fall once for each revolution of the bicycle wheels. This movement closely simulates the slow gaited ride of a horse and provides realism to the youngsters' use of the bicycle as an imaginary "steed of the wild west."

It is foreseeable that other forms of cam providing wheel disks 28, or their equivalent may be used in the practice of this invention. Likewise, other cam shapes than the eccentric shape disclosed may be used. It is also within the intended scope of this invention that motion transmitted means other than the lever arm 36 may be used to provide the same result as obtained thereby, and that other seat engaging means may be devised in place of that which has been disclosed. However, the specific means disclosed are exemplary of one of the simpler forms of this invention, and such is capable of inexpensive manufacture, assembly and sale to the general public.

Such other modifications and improvements as are foreseeably within the scope of this invention are intended to be covered by the hereafter appended claims, unless the language of said claims makes specific exceptions in regard thereto.

What I claim as my invention is:

1. Means for simulating a ride sensation on a bicycle different than is normally experienced thereon, and comprising a wheel disk attachable to the rear wheel of a bicycle, said disk being formed to include an inner peripheral cam contour surface, a lever arm pivotally mountable on the frame of said bicycle and rearwardly of the seat thereof, a cam surface follower mounted on one end of said lever arm and disposable within said wheel disk and in engagement with the inner peripheral cam contour surface thereof, a freely reciprocable seat provided on said bicycle, means engaging the other end of said lever arm to the seat of said bicycle for varied vertical movement of said seat in accordance with the form of said cam contour surface during the operation of said bicycle, and a pivotal member mountable on said frame and engageable with said lever arm for disengaging said cam surface follower from said inner peripheral cam contour surface to obtain a normal bicycle ride.

2. Means for simulating a ride sensation on a bicycle different than is normally experienced thereon, and comprising a wheel disk attachable to the rear wheel of a bicycle, said disk being formed to include an inner peripheral cam contour surface, a lever arm pivotally mountable on the frame of said bicycle and rearwardly of the seat thereof, a cam surface follower mounted on one end of said lever arm and disposable within said wheel disk and in engagement with the inner peripheral cam contour surface thereof, a freely reciprocable seat provided on said bicycle, means engaging the other end of said lever arm to the seat of said bicycle for varied vertical movement of said seat in accordance with the form of said cam contour surface during the operation of said bicycle, and spring means engageable between the frame of said bicycle and the cam surface engaging end of said lever arm for holding said lever arm inactive when said bicycle seat is unoccupied.

3. Means for simulating a ride sensation on a bicycle different than is normally experienced thereon, and comprising a wheel disk attachable to the rear wheel of a bicycle, said disk being formed to include an inner peripheral cam contour surface, a lever arm pivotally mountable on the frame of said bicycle and rearwardly of the seat thereof, a cam surface follower mounted on one end of said lever arm and disposable within said wheel disk and in engagement with the inner peripheral cam contour surface thereof, a freely reciprocable seat provided on said bicycle, means engaging the other end of said lever arm to the seat of said bicycle for varied vertical movement of said seat in accordance with the form of said cam contour surface during the operation of said bicycle, a pivotal member mountable on said frame and engageable with said lever arm for disengaging said cam surface follower from said inner peripheral cam contour surface to obtain a normal bicycle ride, and spring means engageable between the frame of said bicycle and the cam surface engaging end of said lever arm for holding said lever arm inactive when said bicycle seat is unoccupied.

4. In a velocipede of the type having a frame, ground-engaging wheels and a seat, means mounting said seat on said frame for generally upward and downward reciprocation in a straight line, and means for reciprocating said seat including a cam carried by and rotatable with one of said wheels and having a cam track eccentric with respect to the axis of rotation of said one wheel, and a lever pivoted to said frame and connected to said seat, said lever having a follower engaging said cam track to reciprocate said seat in accordance with the rotation of said cam.

5. In a velocipede of the type having a frame, ground-engaging wheels and a seat, means for reciprocably mounting said seat on said frame, means for reciprocating said seat including a cam carried by and rotatable with one of said wheels and having a cam track eccentric with respect to the axis of rotation of said one wheel, a member connected to said seat and having a follower engageable with said cam track to reciprocate said seat in accordance with the rotation of said cam, and means for rendering said reciprocating means inoperative including a control element mounted on said frame for selective engagement with said member to hold the same out of engagement with said cam track.

6. In a velocipede of the type having a frame, ground-engaging wheels and a seat, means for reciprocably mounting said seat on said frame, means for reciprocating said seat including a cam carried by and rotatable with one of said wheels and having a cam track eccentric with respect to the axis of rotation of said one wheel, a member connected to said seat and having a follower engageable with said cam track to reciprocate said seat in accordance with the rotation of said cam, and spring means acting on said member to hold the same out of engagement with said cam track when the bicycle seat is unoccupied.

7. In a velocipede of the type having a frame, ground-engaging wheels and a seat, means mounting said seat on said frame for generally upward and downward movement in a straight line, and means for reciprocating said seat including a cam carried by and rotatable with one of said wheels and having a cam track eccentric with respect to the axis of rotation of said one wheel, and a member connected to said seat and having a follower engageable with said cam track to reciprocate said seat in accordance with the rotation of said cam.

8. In a velocipede of the type having a frame, ground-engaging wheel and a seat, means mounting said seat on said frame for oscillation, and means for oscillating said seat including a cam carried by and rotatable with one of said wheels and having a cam track eccentric with respect to the axis of rotation of said one wheel, and a lever pivoted to said frame and connected to said seat, said lever having a follower engaging said cam track to oscillate said seat in accordance with rotation of said cam.

References Cited in the file of this patent

UNITED STATES PATENTS

| | | |
|---|---|---|
| 642,758 | Runge | Feb. 6, 1900 |
| 868,329 | Corbitt | Oct. 15, 1907 |
| 1,319,213 | Engelbrekt | Oct. 21, 1919 |
| 1,349,509 | Herrick | Aug. 10, 1920 |
| 1,381,954 | Zimmerman | June 21, 1921 |
| 2,232,908 | Gartner | Feb. 25, 1941 |
| 2,860,890 | Oxford et al. | Nov. 18, 1958 |
| 2,904,344 | Lombardo | Sept. 15, 1959 |